Oct. 29, 1968  W. H. HUNLEY ET AL  3,407,769
DOCKING CRADLE

Filed April 28, 1967  2 Sheets-Sheet 1

INVENTORS
WILLIAM H. HUNLEY
JOSEPH R. ANNIBALE

BY *J. E. Hodges*

ATTORNEY

Oct. 29, 1968          W. H. HUNLEY ET AL          3,407,769
                         DOCKING CRADLE
Filed April 28, 1967                          2 Sheets-Sheet 2

INVENTORS
WILLIAM H. HUNLEY
JOSEPH R. ANNIBALE
BY
*O.C. Hodges*
ATTORNEY

United States Patent Office 3,407,769
Patented Oct. 29, 1968

3,407,769
DOCKING CRADLE
William H. Hunley, Alexandria, and Joseph R. Annibale, Arlington, Va., assignors, by direct and mesne assignments, to the United States of America as represented by the Secretary of the Navy
Filed Apr. 28, 1967, Ser. No. 635,954
7 Claims. (Cl. 114—49)

ABSTRACT OF THE DISCLOSURE

An apparatus and method for dry-docking a floating vessel providing a dry docking cradle having inflatable bags attached to the cradle to control its negative buoyancy and the cradle and buoyancy bag assembly suspended under the water surface from additional inflatable bags on the surface. The cradle assembly is floated out of the dry dock and placed under the vessel and attached thereto in open water before the vessel is moved into the dry dock chamber. The dry-docking is then completed in a conventional manner.

---

The invention described herein may be manufactured and used by or for the Government of the United States of America for governmental purposes without the payment of any royalties thereon or therefor.

The present invention relates to a method and apparatus for dry docking a vessel and more particularly to a system whereby the vessel to be dry docked is fitted to a protective docking cradle before the vessel is moved into the drydock.

In the conventional method of dry docking, the vessel is floated into the dry dock chamber through an opening in one end of the dry dock. The opening is then closed; the vessel positioned over cradling blocks on the bottom of the docking chamber and the water is pumped out of the chamber lowering the vessel onto the blocks.

The principal disadvantage of the present system is the difficulty encountered in properly placing and maintaining the vessel centered on the cradle blocks while the chamber is being emptied of water. If the vessel is misaligned with respect to the blocks, abnormal stresses may be placed on the vessel which may result in serious damage to the hull structure.

This process is made more difficult if the vessel is of a type having instrumentation or other structure which must protrude outside the normal hull surface. Imperfect placement of the vessel may result in damage to sensitive instrumentation or control surfaces on the hull.

The problem is made more severe in the case of floating dry-dock ships because of water motion in the well of a ship when ballasted down at sea which makes control of the vessel within the well extremely difficult.

In accordance with the present invention a separate floatable docking cradle is provided and is suspended from its flotation means by a series of winches and cables. Additional flotation means are provided on the cradle which may be partially flooded to control the buoyancy of the cradle and also to adjust the mass distribution of the cradle such that its reaction to wave motion may be matched with that of the vessel to be docked. The mass distribution of the cradle assembly is adjusted and it is then floated out from the dry dock and lowered from the flotation means to a depth which will place it beneath the lowest portion of the vessel. The vessel is then placed over the cradle and the cradle raised by winches on the vessel, and the cradle placed in exact register with the vessel hull. The cradle and hull are then secured together and the vessel with its cradle towed into the drydock and the docking completed in a conventional manner. Thus the vessel is lowered to the bottom of the dock and the vessel is firmly and safely positioned for servicing.

Objects

Thus it is an object of the present invention to provide a method of dry-docking a vessel in a manner which minimizes the risk of damage to the vessel.

A further object of the invention is to provide a system for dry-docking a vessel using a separate floatable cradle attached to the vessel outside the drydock chamber.

Another object of the invention is the provision for accurately attaching a floating cradle to a vessel to be drydocked.

Another object of the invention is the provision for safely dry-docking vessels having an irregular hull surface.

A still further object of the invention is to provide a system for safely dry-docking a vessel which is adaptable to either floating or stationary dry docks.

Other objects and many of the attendant advantages of this invention will be readily appreciated as the same becomes better understood by reference to the following detailed description when considered in connection with the accompanying drawings wherein.

Figure 1:
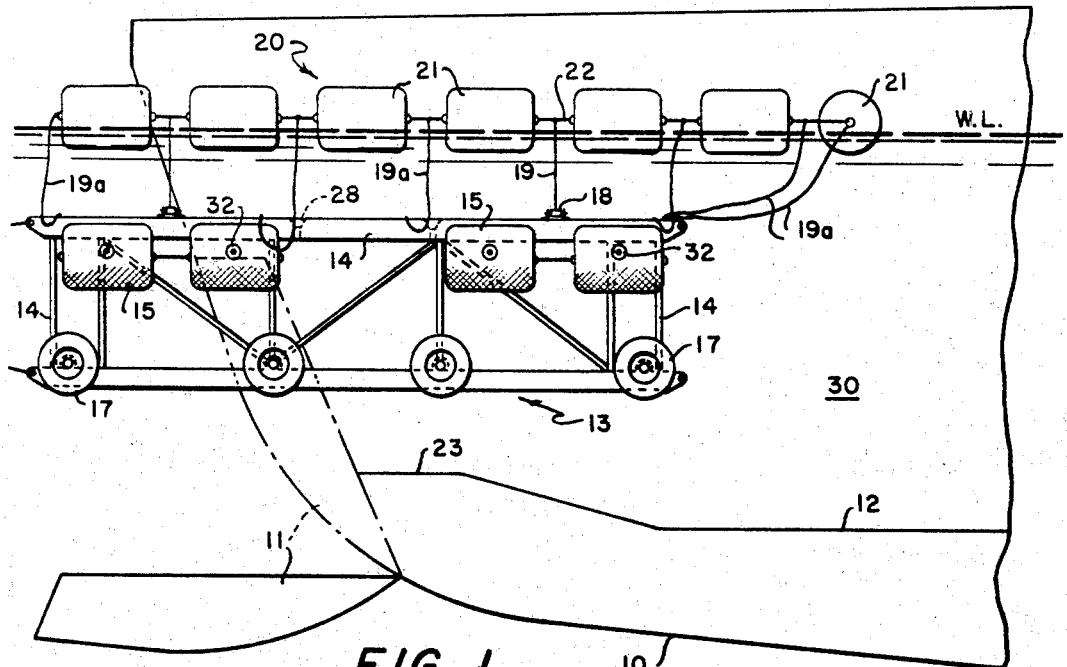
FIG. 1 is an elevation view of the cradle and the dry dock ship.
Figure 4:
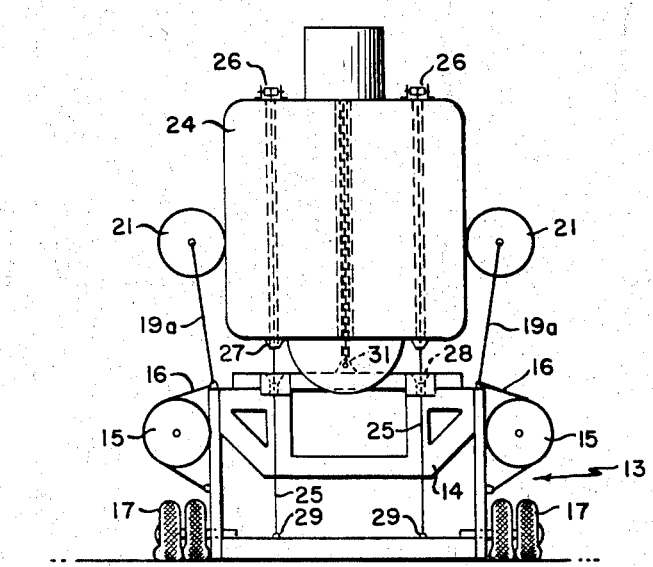
FIG. 4 is an end view of the cradle assembly attached to a vessel.

Referring now to the drawings, wherein like reference characters designate like or corresponding parts throughout the several views there is shown in FIG. 1 a dry dock ship 10 having gate 11 in one end thereof and a bottom surface 12. The docking cradle assembly is shown generally at 13 and includes a cradle 14 adapted for the particular vessel to be docked. Attached to cradle 14 is a series of buoyancy control bags 15 of an elastic material which are used to adjust the buoyancy of the cradle and also acts as fenders to protect against collisions between the cradle and the docking ship. The bags are secured to the cradle by cables 16 as shown in FIG. 4. Also, attached to the cradle is a series of pneumatic tired wheels 17 which act as shock absorbers between the cradle and the bottom 12 of the dry dock and aid in maneuvering the cradle in the dry dock. The tires may be deflated to finally lower the cradle to the dry dock bottom as shown in FIG. 4. The cradle includes winches 18 and cables 19 and 19a by which the cradle is attached to flotation means 20. The flotation means 20 consists of a series of pneumatic fenders 21 joined in a U shape through cables 22 and is attached to the cradle 14 through the system of cables 19 and winches 18 as previously described.

Figure 2:
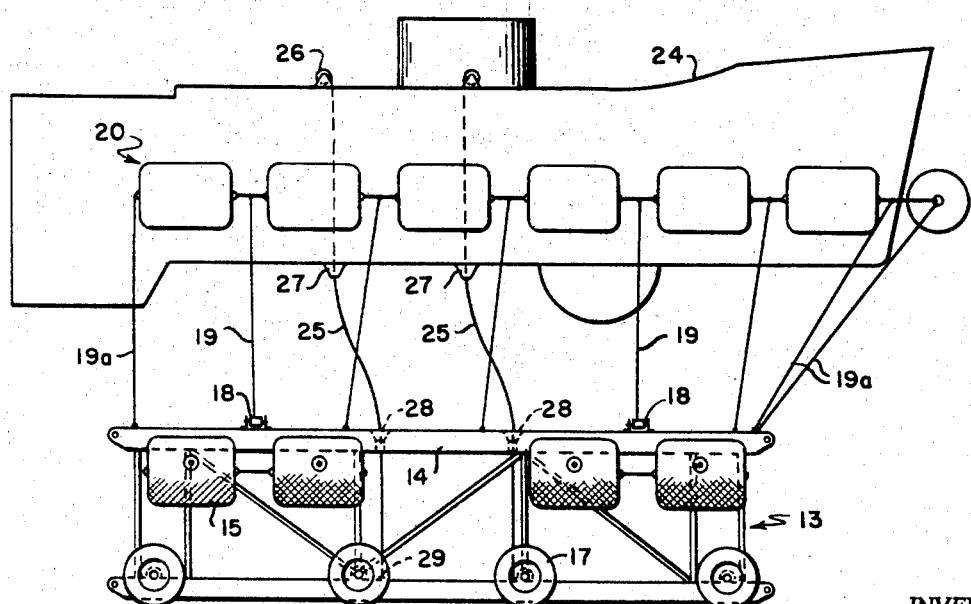
FIG. 2 is an elevation view showing the cradle assembly positioned under and attached to a vessel.

Referring now to FIG. 2 there is shown the cradle assembly 13 positioned under a vessel 24 which is to be placed in the dry dock ship 10. The vessel is attached to the cradle through cables 25 and winches 26. The cables 25 pass from the winches 26 through cones 27 on the vessel and cone sockets 28 in the cradle frame and are secured to the frame at 29.

The operation of the system is as follows: with the cradle assembly within the docking ship 10 and gate 11 closed, the tires 17 are inflated and cables 19 shortened through winches 18 to reduce the draft of the assembly to less than the distance from the water line to the sill 32 of the docking ship. The chamber 30 is then flooded and the cradle assembly floated within the docking ship well. The cradle buoyancy and mass distribution are then adjusted by apportioning the water and air in the buoyancy bags 15 by means of valves 32. Gate 11 is opened and the assembly is floated out clear of the ship as shown in FIG. 1 and placed near the vessel to be docked. The U shape of the flotation fenders 21 forms a slip for the vessel during the process of attaching the cradle to the vessel.

The cradle is next lowered by means of winches 18 to a depth sufficient to clear the deepest portion of the hull of the vessel 24.

Figure 3:
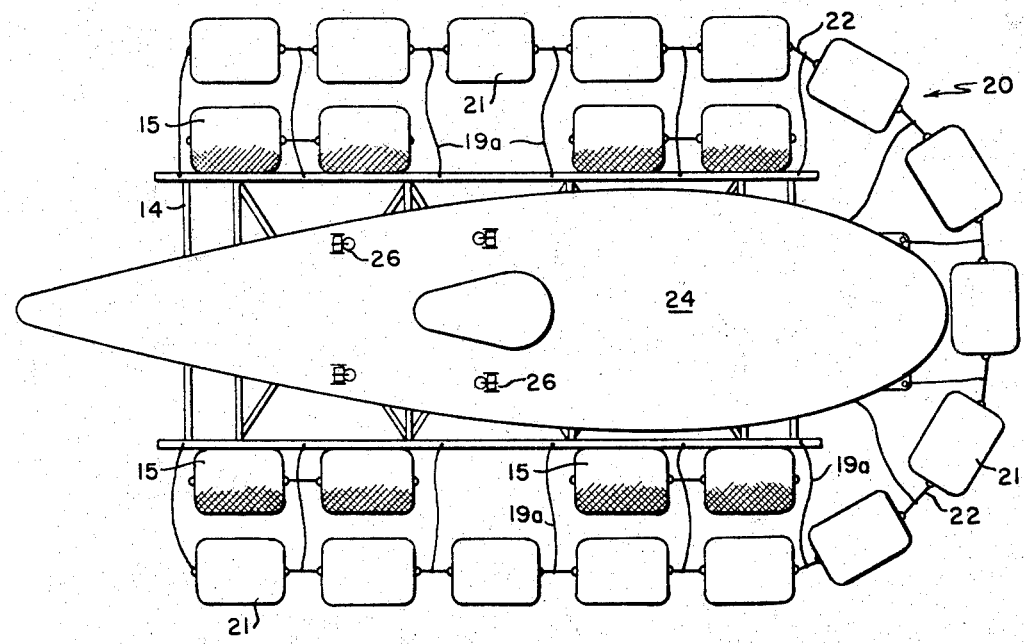
FIG. 3 is a plan view of the cradle assembly with a vessel positioned over the cradle.

The vessel is positioned within the slip as shown in FIG. 3 thus placing it roughly over the cradle 14. Cables 25 are then passed from the vessel through cones 27 and cone sockets 28 and secured to the cradle at 29 as shown in FIG. 4.

Winches 26 on the vessel are then operated to bring the cradle up toward the vessel. As the cradle nears the vessel cones 27 come into register with cone sockets 28 thus placing the vessel accurately in the cradle. Before the vessel and cradle are completely joined, securing chain 31 is attached to the cradle as shown in FIG. 4. The cradle is then pulled tight to the vessel and the chain and cables 25 are secured. The vessel and cradle are then towed into the dry dock ship 10, gate 11 closed and the vessel and cradle are lowered to the bottom 12 of the ship by pumping the water from chamber 30. As the cradle touches the bottom the tires 17 act as shock absorbers and provide a means for finally positioning the cradle in the ship. With the cradle finally positioned the tires are deflated and the cradle frame lowered to the bottom surface 12. The cradle is then secured in the chamber and the vessel is positioned for servicing or transport as required.

The invention is particularly suited for use with floating dry docks because of the protection provided against collision damage between the vessel and the dock and the vessel and the cradle. First, the characteristics of the vessel and cradle may be matched to minimize relative motion between them during attachment of the cradle. Secondly, the vessel and its cradle are joined outside the dock thus little or no maneuvering of the vessel is required within the confines of the dock chamber. Thirdly, the flotation means and buoyancy control means consisting of inflatable bags provide an additional function as fenders to prevent the vessel from contacting the walls of the dry dock chamber. Fourthly, the pneumatic tires on the cradle act as vertical shock absorbers and provide limited mobility within the dock after it has been pumped dry as well as the means for finally lowering the cradle to the bottom of the dock. The tires provide a secondary function in that they may be used in conjunction with the buoyancy control means to provide additional mass distribution and buoyancy control.

An additional advantage is gained by joining the vessel and cradle outside the dock in that the cradle may be accurately positioned and avoid damaging instrumentation pods or control surfaces which are required to protrude from the vessel's normal hull surface and is thus of great value in the handling of research vessels, submarines or destroyers which normally carry such instrumentation.

While the operation of the invention has been described in connection with a floating dry dock, it is readily adaptable for use with stationary, land based docks retaining all of its advantages in this use.

Obviously many modifications and variations of the present invention are possible in the light of the above teachings. It is therefore to be understood that within the scope of the appended claims the invention may be practiced otherwise than as specifically described.

What is claimed is:

1. A floatable cradle assembly for dry-docking a floating vessel comprising:
   a cradle adapted to accept the hull of a vessel;
   first flotation means attached to said cradle;
   second flotation means attached to said cradle;
   means for suspending said cradle and said second flotation means from said first flotation means; and
   means for attaching said cradle to a floating vessel.

2. The assembly defined in claim 1 and further comprising means on said second flotation means for varying the buoyancy thereof.

3. The assembly defined in claim 1 and further comprising means for varying the mass distribution of said assembly.

4. The assembly defined in claim 1 and further comprising means for varying the length of said suspension means whereby the draft of the cradle assembly may be adjusted.

5. The assembly defined in claim 1 wherein said first flotation means and said second flotation means consist of inflatable fenders.

6. The assembly defined in claim 1 wherein said attaching means includes means for aligning said cradle in predetermined register with said floating vessel.

7. A method of dry-docking a floating vessel comprising the steps of:
   floating a docking cradle near the floating vessel;
   lowering said cradle to a depth greater than the lowermost portion of said vessel;
   placing said vessel over said cradle;
   attaching said cradle to said vessel;
   raising said cradle by the attaching means;
   placing said cradle in predetermined register with the hull of said vessel;
   securing said cradle to said vessel;
   moving said cradle and said vessel into a flooded dry dock;
   closing the dry dock to form an enclosed chamber; and
   removing the water from said chamber thereby lowering said cradle and vessel to the bottom of the dry dock.

References Cited

UNITED STATES PATENTS 3,123,036   3/1964   Lih _____ 114—49

FOREIGN PATENTS 1,351,139   12/1963   France.

ANDREW H. FARRELL, *Primary Examiner.*